United States Patent [19]

Edling et al.

[11] 3,957,291

[45] May 18, 1976

[54] BALL JOINT ASSEMBLY WITH INTERNAL PASSAGES

[75] Inventors: Porter R. Edling, Houston, Tex.;
Robert K. Jefferies, Reston, Va.;
Joseph T. Shelton, Houston, Tex.

[73] Assignee: The Offshore Company, Houston, Tex.

[22] Filed: Jan. 10, 1975

[21] Appl. No.: 540,000

[52] U.S. Cl. .............................. 285/136; 285/261; 285/282
[51] Int. Cl.² .......................................... F16L 39/00
[58] Field of Search ............... 285/137 R, 136, 166, 285/167, 261, 262, 264, 276, 282

[56] References Cited
UNITED STATES PATENTS

| | | | |
|---|---|---|---|
| 2,417,491 | 3/1947 | Hill | 285/136 |
| 3,727,954 | 4/1973 | Oliver | 285/282 X |

*Primary Examiner*—Werner H. Schroeder
*Assistant Examiner*—Wayne L. Shedd
*Attorney, Agent, or Firm*—Vinson, Elkins, Searls, Connally & Smith

[57] ABSTRACT

A multi-passage ball joint assembly for connecting a riser or similar pipe to a well pipe therebelow and adapted primarily for use in underwater installations. The ball member of the joint assembly has a main longitudinal bore or passage through which well operations may be conducted and additionally is formed with at least one other passage for conducting fluid therethrough. The housing of the joint assembly includes passageways which are in communication with the bore and passages extending through the ball member in all positions of said ball member relative to the housing whereby fluid may be conducted downwardly through the ball joint for actuating devices therebelow or for other purposes. This abstract is neither intended to define the invention of the application which, of course, is measured by the claims, nor is it intended to be limiting as to the scope of the invention in any way.

7 Claims, 6 Drawing Figures

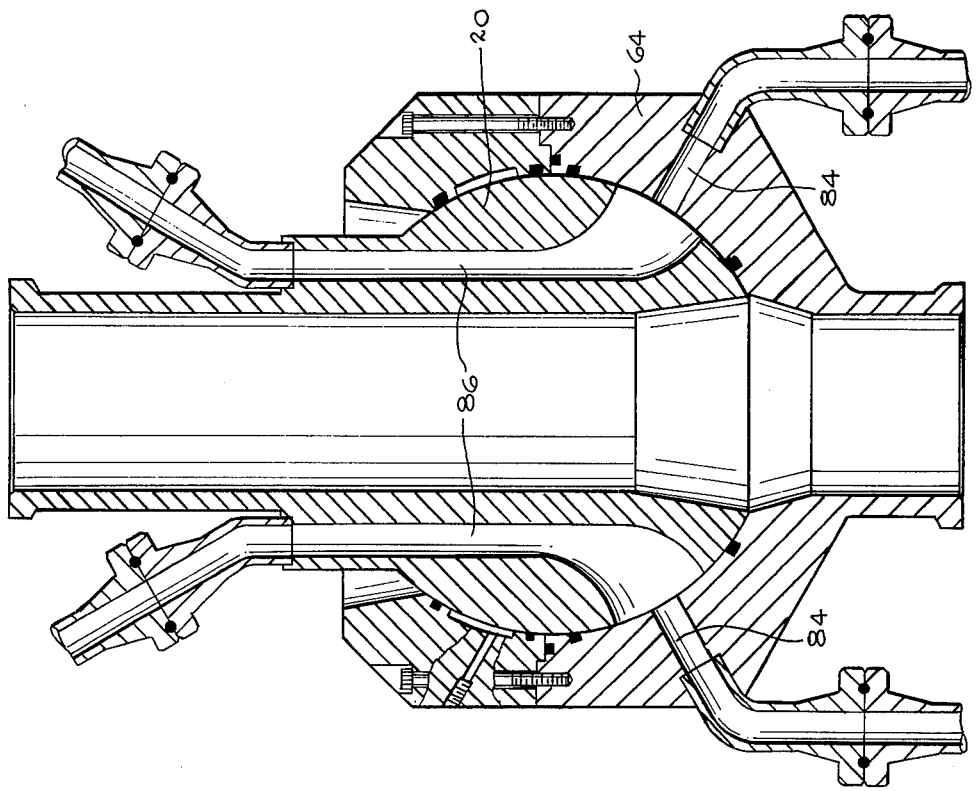
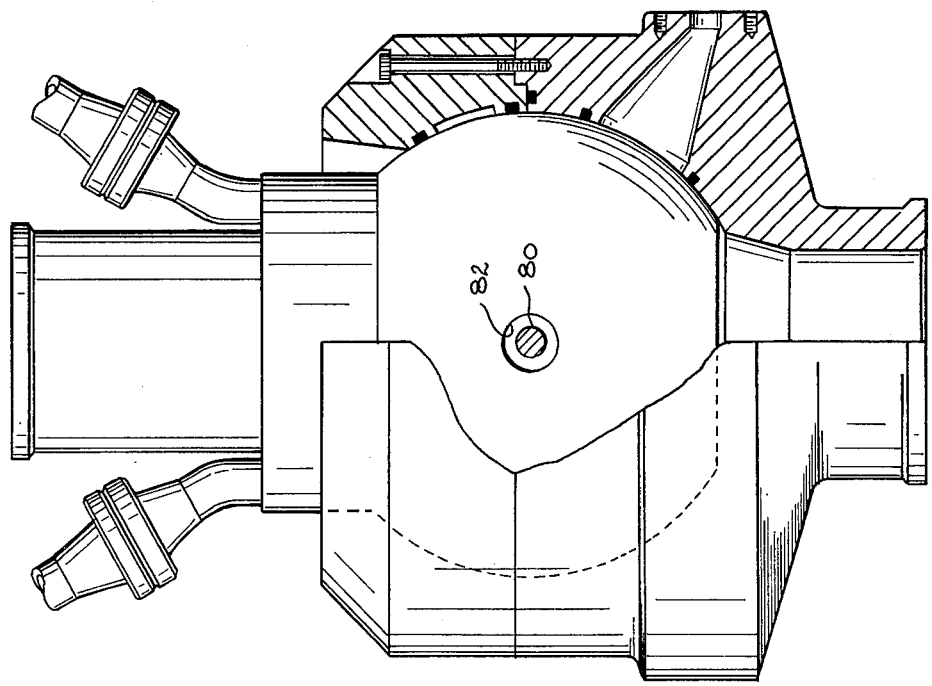

BALL JOINT ASSEMBLY WITH INTERNAL PASSAGES

BACKGROUND OF THE INVENTION

1. Field of the Invention

This invention relates particularly to marine riser joints where it is desired to provide a conductor or conductors through said joint in addition to the usual main bore through which drilling operations are performed. 2. The Prior Art The point of connection of a riser pipe to the upper end of a well pipe at the ocean bottom is subject to high bending moments due to the shifting of the ocean currents and the movement of the drilling platform. Therefore, the riser joint at or near this point of connection has to be flexible to withstand these high bending moments and the prior art suggests the use of a ball joint to provide such flexibility. In many instances, hydraulically controlled equipment, such as a blowout preventer, is located below the joint and in such case, a conduit line or lines are required to conduct control fluid to said equipment.

In the prior art, it has been the practice to utilize multi-conduit lines or conductors which are located to extend around the exterior of the joint so as to bypass the same. The use of multi-conduit bypass lines is unsatisfactory because the lines are unprotected and subject to being broken, may interfere with guidelines, may inhibit access to the blowout preventer or other hydraulically-actuated equipment for maintenance purposes, and may interfere with sub-sea television viewing. In addition, the bypass lines or conductors undergo constant flexing as the joint parts move with the result that they are ruptured and have to be replaced several times a year at a substantial expense.

OBJECTS OF THE INVENTION

An object of this invention is to eliminate multiconduit bypass lines which extend around the exterior of a marine riser joint and which are subjected to flexing movement as the joint undergoes movement.

A further object of this invention is to provide a single marine riser joint assembly with the usual main internal bore through which drilling and other well operations are performed and which has an additional internal passage or passages for conducting hydraulic control or other fluid to equipment below the joint assembly, whereby external conduits bypassing the joint and their inherent disadvantages are eliminated.

Another object of this invention to provide a marine riser joint assembly in which the main bore and passages formed in the ball member maintain communication with associated passageways in the housing of joint in all positions of said ball member and such housing with respect to each other.

A still further object of this invention to provide a marine riser joint assembly with the usual main internal bore and with an additional internal passage or passages with the joint being able to undergo limited universal pivotal movement to provide the required flexibility without interfering with normal functions of the bore and passages.

These and other objects and features of advantage of this invention will become apparent upon reading the following detailed description of the preferred embodiment of the invention together with the accompanying drawings.

BRIEF DESCRIPTION OF THE DRAWINGS

Wherein like numerals indicate like parts, and wherein illustrative embodiments of this invention are shown, FIG. 5 is a view partially in section and partially in elevation illustrating one type of stop means for limiting rotational movement between the parts of said joint, and FIG. 6 is a vertical sectional view of a second embodiment of the invention.

DESCRIPTION OF THE PREFERRED EMBODIMENTS

Figure 1:
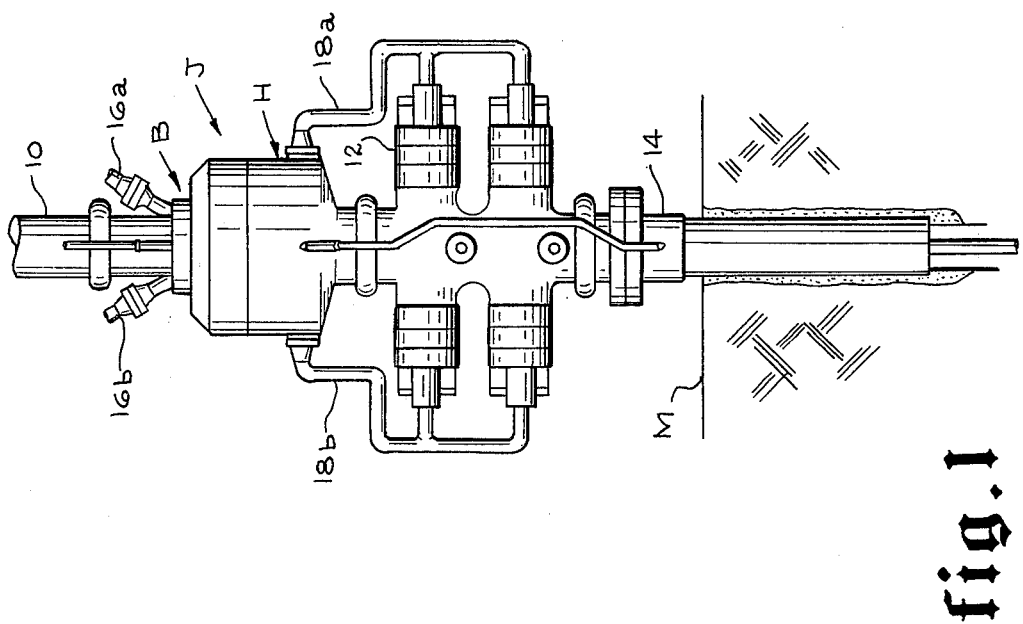
FIG. 1 is a diagramatic view showing a ball joint assembly constructed in accordance with this invention located with respect to other sub-sea well apparatus.

Referring to FIG. 1, the ball joint assembly, generally indicated at J, of the invention includes a ball member B mounted in a retainer housing H. The upper end of the ball member B is connected to a riser 10, or similar pipe, extending downwardly from a drilling vessel or platform (not shown) located on the water surface. The lower end of the housing H is shown connected to a blowout preventer stack 12. A coupling 14 connects the blowout preventer stack with a well pipe P which extends within a well W; the well is drilled through the subsea formations, the upper end of which is indicated by mud line M. A drill string or other apparatus (not shown), for conducting well operations is normally run through the riser pipe 10, the ball joint assembly J, the blowout preventer stack 12, the coupling 14 and the well pipe P.

Conductors 16a and 16b, for conducting fluid to control subsea well apparatus extend downwardly from the surface. As will be explained, the conductors communicate with internal passages of the ball joint assembly J and through such passages, communicate with conduits 18a and 18b. The conduits extend to apparatus or areas below the joint assembly.

As illustrated, conductor 16a and conduit 18b and conductor 16b conduit 18b comprise hydraulic pressure control lines for actuating the blowout preventers. However, it is understood that the lines formed by the conductors and conduits may be used for any purpose which may require conducting fluid to an area below the joint assembly J.

Figure 2:
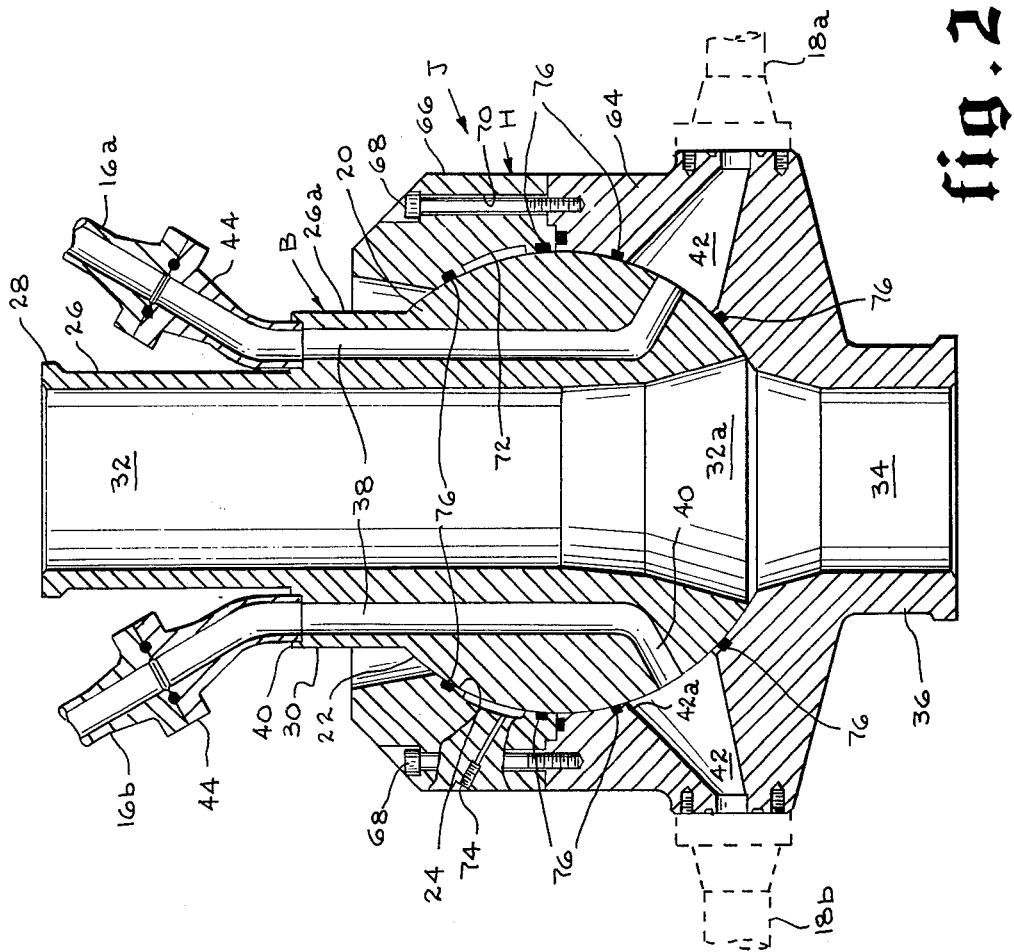
FIG. 2 is a vertical sectional view of a first embodiment of said ball joint assembly.

Referring now to FIG. 2 showing the details of the ball joint assembly J, the lower end of the ball member B is formed as a ball portion 20, the outer surface 22 of which is generally spherical in shape. This outer sperical surface 22 is adapted to seat and be movable within a generally spherical seat 24 formed within the retainer housing H.

The ball member B has a tubular extension 26 extending upwardly and a connecting flange 28, or other type of connection, is formed at its extreme upper end for connection with the riser 10 or other pipe. The lower portion 26a of the extension is of larger diameter than the upper portion, said larger diameter forming an annular surface 30 which is adapted, as will be explained, to coact with the retainer housing H to limit universal pivotal movement of the ball member B relative to housing H. Extending through the ball member B is a longitudinal bore 32 which is flared outwardly at its lower end as shown at 32a. The lower end of the bore 32 communicates with a complementary bore 34 which is provided in a downward extension 36 formed on the retainer hosuing H. As wll be explained the bores 32 and 34 are always in communication to permit tools and well equipment to be run through the joint assembly J and to permit well operations to be performed therethrough.

Figure 4:
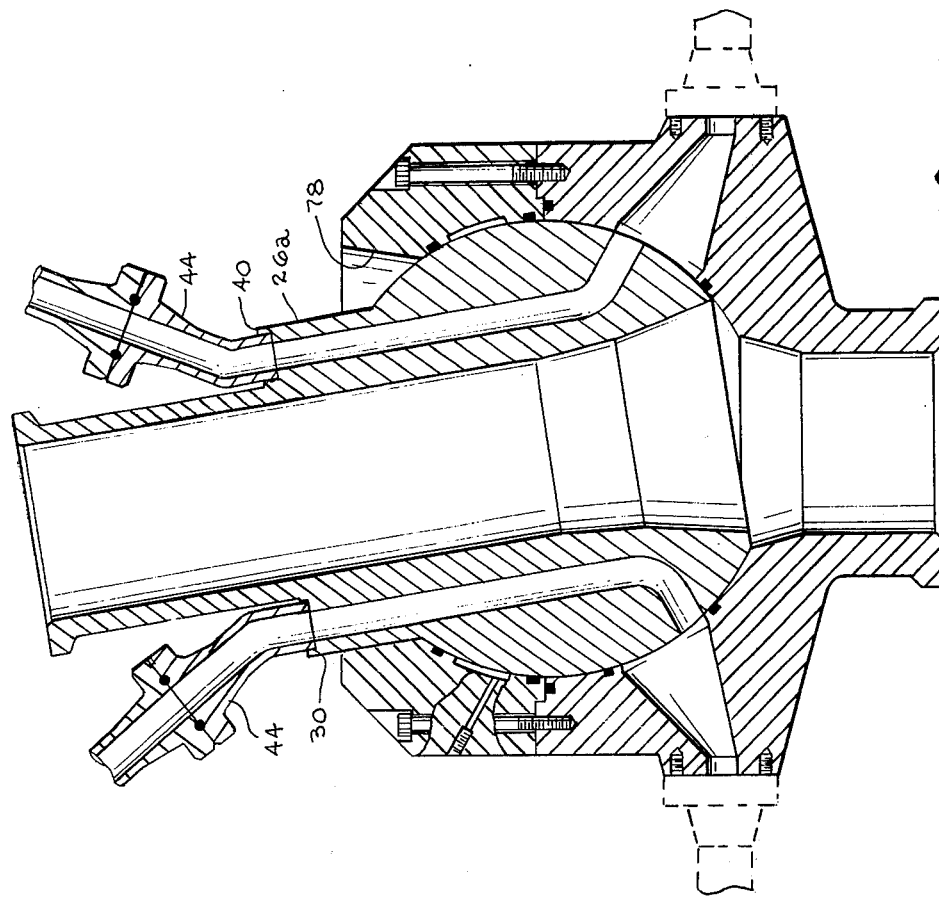
FIG. 4 is a view similar to FIG. 2 illustrating the ball member of the joint pivoted with respect to its housing.

In addition to the main bore 32, the ball member is formed with a pair of passages 38 which extend downwardly from the annular shoulder 40 formed between the lower enlarged portion 26a and the upper extension 26 of said ball member. As shown in FIGS. 2 and 4, each passage 38 has an outwardly directed portion 41 at its lower extremity exiting on the outer surface 22 of ball portion 20 and each passage 38 communicates with a coacting flared passageway 42 formed in the retainer housing H. The enlarged or flared portion 42a of each passageway 42 is of such size that the lower end 41 of each passage 38 remains in communication with passageway 42 in all positions of the ball member B relative to the housing H. The upper end of one passage 38 has a flange connection 44 for connection to the conductor 16a whereby fluid may be conducted downwardly from the drilling area through said passage 38 and into the passageway 42. The conduit 18a is connected to the outlet end of one of the passageways 42 in the retainer housing H. The other passage 38 has connection through its flange 44 with the conductor 16b and the second passageway 42 communicating with this passage has the conduit 18b connected to the outlet end of said second passageway. The conductors 16a and 16b and conduits 18a and 18b together with passages 38 and passageways 42 form a fluid line communicating with and extending through the ball joint assembly J. Although two passages 38 are illustrated in FIG. 2, any desired number may be employed.

Figure 3:
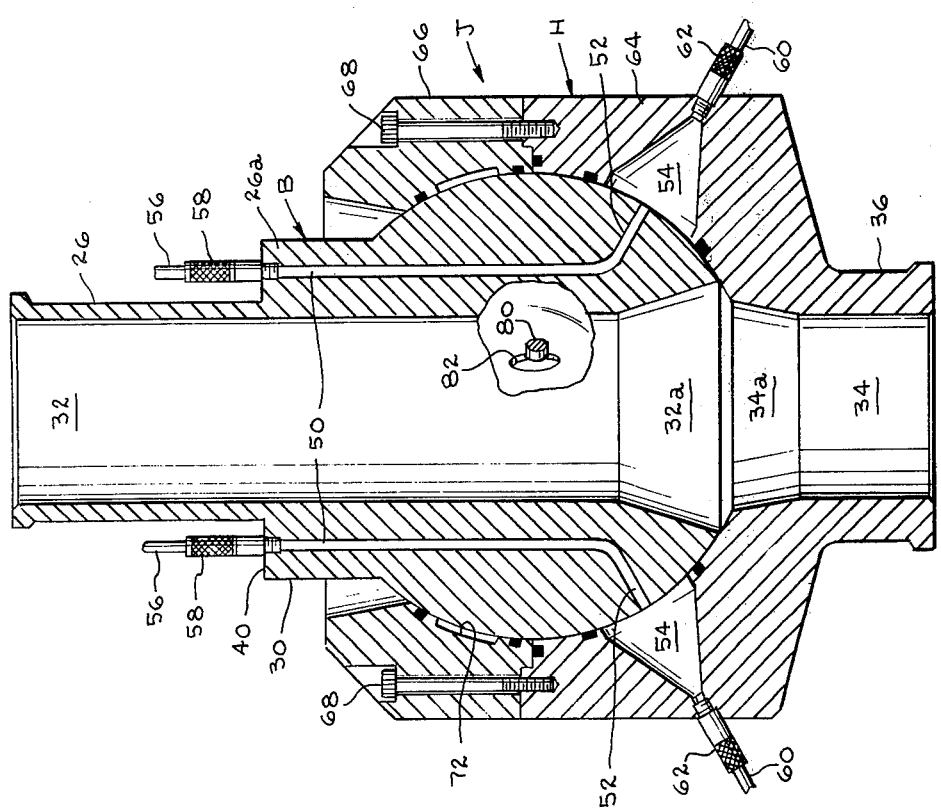
FIG. 3 is a vertical sectional view taken at right angles to the view in FIG. 2.

In addition to the passages 38, the ball member B may also be provided with passages 50 which are of a smaller diameter than the passages 38. The general configuration of each passage 50, as is shown in FIG. 3, is similar to the passages 38 in that each has a generally vertical portion and a lower outwardly curved portion 52 which exits into a flared passageway 54 formed in the retainer housing H. Because of the size of the flared portion of the passageway 54a, each passage 50 will at all time communicate with its related passageway 54. A conductor 56 is connected to the upper end of each passage 50 through a suitable connecting means 58; similarly a conduit 60 having connection through a connector 62 is attached and is in communication with each flared passageway 54 of the housing H. The conduits 60 may conduct fluid to the well pipe 14 or to any other area or tool below the joint assembly.

From the foregoing it can be seen that well operations may be carried out through the central bores 32 and 34 of the ball member B and housing H. It is noted that the lower end of bore 32 of the ball member B is flared at 32a while the upper end of the bore 34 in the housing H is flared at 34a; with this arrangement there is always a sufficient size bore to carry on well operations or to lower well tools through the joint assembly J, regardless of the position of the ball member B with respect to the retainer housing H.

In addition various control fluids may be transmitted from the drilling area, through the ball joint assembly J, to the controlled subsea apparatus. The conductors 16a, 16b and 56 extending from the surface to the ball joint assembly J ball member B are preferably secured to the riser pipe 10. Likewise, the conduits 18a, 18b and 60 extending from the housing H to the subsea apparatus are preferably secured to the member to which it connects. The passages 38 and 50 through the ball member B are in continuous communication with passageways 42 and 54 through the housing H, no matter how the ball member B is pivoted with respect to the housing H. Since the conductors 16a, 16b and 56 and the conduits 18a, 18b and 60 are secured to different elements, neither the conductors nor the conduits are subjected to flexing and associated bending stresses, when the ball member B is pivoted with respect to the housing H. Also they present no resistance to movement of the ball joint J because the conductors move with the ball member B and the conduits remain stationary with the housing H.

The retainer housing H may be constructed in any desired manner but it is preferable that it be formed of two sections connected together. As illustrated the lower or base section 64 has the extension 36 thereon and also has the flared bore 34 and the various flared passageways 42 and 54 formed through its walls. Its internal surface forms a part of the seating surface 24 which is engaged by the outer surface 22 of the ball member B.

An upper housing section 66 encircles the upper half of the ball 20 of the ball member B and also surrounds a part of the annular surface 30 of the extension. Suitable bolts or other fastening means 68 extend through aligned openings 70 to secure the upper section 66 to the lower section 64 with the ball portion 20 confined therebetween. For the purpose of lubricating between the spherical surface of the ball member and the housing seat 24, an annular lubricating groove 72 is formed on the inner surface of the seat portion in the upper section 66 and a lubricant injection port 74 is provided to inject lubricant therein. Suitable seals 76 are provided between the outer surface 22 of the ball portion 20 of the ball member B and the seating surface 24 of the retainer housing H. These seals are located on each side of the lubricant groove 72 and on each side of the flared passageways 42 and 54.

As can be seen in FIG. 4, the universal pivotal movement of the ball member B with respect to the housing H is limited by the engagement of annular surface 30 of the lower portion 26a of extension 26 with an annular tapered surface 78 of the upper section 66 of the housing H. Since the connecting flanges 44 and connectors 58 are attached to the shoulder 40 of the lower portion 26a of the ball member B extension 26, they do not interfere with the universal pivotal movement of the ball member B, nor are they subject to any stress when the ball member B is pivoted.

Even though the limited universal pivotal movement of the ball member B with respect to the housing H will not misalign the passages 38 and 50 through the ball member B and the passageways 42 and 54 through the housing H, excessive longitudinal rotation of the ball member B with respect to the housing H would result in a misalignment. To prevent this, stop means are provided which will permit limited universal pivotal movement while preventing excessive relative rotation of the parts. The stop means, as shown in FIGS. 3 and 5 may consist of a pin 80 extending radially outwardly from the outer surface 22 of the ball member B and projecting into a circular recess 82 formed in the housing H seat 24. The amount of rotational movement is controlled by the relationship between the size of the pin 80 and the area of the recess 82.

To prevent excessive stress from being applied to the pin 80 during pivotal movement of the ball member B with respect to the housing H, the relationship between the size of the pin 80 and the area of the recess 82 is such that annular surface 30 of the ball member B is engaged by the tapered surface 78 of the housing before the pin 80 engages the side of the recess 82.

In FIG. 6 there is shown a modified version of the ball joint assembly J of this invention. In this modification the ball joint assembly J is constructed as described above except that instead of the passageways 84 through the base 64 of the retainer housing H being flared, the passages 86 through the ball portion 20 are flared. This flaring performs the same function as the flaring of the passageways in the first embodiment.

From the foregoing description it can be seen that the objects of this invention have been obtained. A marine riser joint has been disclosed with internal passageways through which drilling and well completion operations can be conducted and through which fluids for hydraulic or other well lines may pass without the use of multiconduit bypass lines.

The foregoing disclosure and description of the invention is illustrative and explanatory thereof and various changes in the size, shape and materials or changes as to the details of the illustrated construction may be made within the scope of the appended claims without departing from the spirit of the invention.

What is claimed is:

1. A marine riser ball joint assembly to connect a marine riser with a lower element comprising:
   a ball member having a generally tubular stem portion and having a ball portion formed on one end of the stem portion,
   a generally spherical outer surface on said ball portion,
   a retainer housing surrounding said ball portion,
   an inner seating surface in said retainer housing, engaging outer spherical surface of said ball member ball portion permitting universal pivotal movement of said ball member relative to said retainer housing,
   said ball member having a plurality of passages extending therethrough from one end of said ball member exterior of said housing to the exterior surface of said ball portion interior of said housing,
   said retainer housing having a plurality of passageways extending through its walls and opening at said inner seating surface,
   at least one of said passages and passageways in each pair having a flared end portion for maintaining fluid communication between the end of said passages interior of said housing and said passageways during said universal pivitol movement of said ball member relative to said retainer housing, and
   stop means limiting said universal pivotal movement of said ball member relative to said housing whereby each of said passageways communicates with one and only one of said passages in all positions of said ball member relative to said housing.

2. The marine riser ball joint assembly of claim 1 wherein the passages through the ball member extend from the stem portion of the ball member to the exterior surface of the ball portion.

3. The marine riser ball joint assembly of claim 1 wherein the stop means includes:
   an annular surface of said ball member and an annular surface of said housing which coact to limit the universal pivotal movement; and
   a circular recess formed in the inner seating surface of said retainer housing and a pin extending radially outwardly from the spherical outer surface of said ball portion which pin projects into said circular recess to prevent excessive rotation.

4. A marine riser ball joint assembly adapted to connect a marine riser with a lower element comprising:
   a ball member including a generally tubular stem portion and a ball portion formed on one end of the stem portion,
   a generally spherical outer surface on said ball portion,
   said ball member with said ball portion having a longitudinal bore extending therethrough to permit tools to be moved through said member,
   a retainer housing surrounding said ball member,
   an inner seating surface within said housing which coacts with said outer spherical surface of said ball portion permitting universal pivotal movement of said ball member relative to said retainer housing,
   said housing having a longitudinal bore extending therethrough communicating with said bore of said ball member in all positions of said ball member relative to said housing,
   said ball member having at least one other passage of a size smaller than the longitudinal bore extending therethrough from one end of said ball member exterior of said housing to the exterior surface of said ball portion interior of said housing,
   said housing having as many passageways extending through its walls as said ball portion has passages and opening at said inner seating surface,
   at least one of each of said passages and passageways having a flared end portion so that a substantially straight fluid line through said ball joint assembly is provided, and
   stop means which permits limited universal pivotal movement of said ball member relative to said housing while preventing excessive rotation about a longitudinal axis of said housing relative to said ball member so that each of said passageways continuously communicates with only one of the passages in all positions of said ball member relative to said housing.

5. The marine riser ball joint assembly of claim 4 wherein the passages through the ball member extend from the stem portion of the ball member to the exterior surface of the ball portion.

6. The marine riser ball joint assembly of claim 4 including
   a conductor means attached to the ball members communicating with each of said passages therethrough; and
   a conduit means attached to the outer surface of said retainer housing and communicating with each of said passageways through the housing walls, said conduit means extending from the marine riser joint assembly to areas remote from the ball joint assembly.

7. The marine riser ball joint assembly of claim 4 wherein the stop means includes:

an annular surface of said ball member and an annular surface of said housing which coact to limit the universal pivoted movement; and a circular recess formed in the inner seating surface of said retainer housing and a pin extending radially outwardly from the spherical outer surface of said ball portion which pin projects into said circular recess to prevent excessive rotation.

* * * * *